United States Patent [19]

O'Sullivan

[11] Patent Number: 4,478,663
[45] Date of Patent: Oct. 23, 1984

[54] PLASTIC SHEET HAVING HIGH GLOSS AND LOW COEFFICIENT OF FRICTION AND METHOD FOR PRODUCING THE SAME

[75] Inventor: Eileen F. O'Sullivan, Rochester, N.Y.

[73] Assignee: American Can Company, Greenwich, Conn.

[21] Appl. No.: 537,166

[22] Filed: Sep. 30, 1983

Related U.S. Application Data

[63] Continuation of Ser. No. 360,388, Mar. 22, 1982, abandoned.

[51] Int. Cl.$^3$ .................. B29D 23/10; B32B 31/12; B32B 1/08
[52] U.S. Cl. .................. 156/203; 156/202; 156/244.11; 156/244.24; 264/284; 264/293; 428/36; 428/156; 428/172
[58] Field of Search .............. 428/36, 141, 156, 172; 264/284, 293, 1.6, 2.7, 216; 156/244.11, 244.24, 202, 203, 204, 205

[56] References Cited

U.S. PATENT DOCUMENTS

| | | | |
|---|---|---|---|
| 3,260,410 | 11/1962 | Brandt | 222/107 |
| 3,300,286 | 1/1967 | Nalband et al. | 29/183.5 |
| 3,347,419 | 10/1967 | Brandt | 222/107 |
| 3,381,818 | 5/1968 | Cope et al. | 206/84 |
| 3,388,017 | 6/1968 | Grimsley et al. | 156/203 |
| 3,540,959 | 11/1970 | Connor | 156/203 |
| 3,740,306 | 6/1973 | Kosbab et al. | 161/214 |
| 3,958,721 | 5/1976 | Kushida et al. | 222/107 |
| 3,976,224 | 8/1976 | Ericson et al. | 222/107 |
| 4,329,385 | 5/1982 | Banks et al. | 428/141 |
| 4,330,351 | 5/1982 | LoMaglio et al. | 428/36 |

Primary Examiner—Paul J. Thibodeau
Attorney, Agent, or Firm—Stuart S. Bowie; Harry C. Engstrom

[57] ABSTRACT

A plastic sheet (13) having a surface with low friction and high gloss is produced by extruding a layer of thermoplastic and pressing it while hot against the surface of a chill roller (17). The surface of the chill roller (17) is characterized by being highly polished and having minute randomly distributed depressions therein of an average depth of about 5 microns, a depth standard deviation of less than 3 microns, and an average frequency of about 3,000 per square centimeter. The thermoplastic layer may be laminated to a single or multilayer base (12) to form a finished product (21). A polyethylene surface layer will have a coefficient of friction generally less than 1.0 with respect to itself, while the surface nonetheless retains a high gloss appearance.

3 Claims, 8 Drawing Figures

PLASTIC SHEET HAVING HIGH GLOSS AND LOW COEFFICIENT OF FRICTION AND METHOD FOR PRODUCING THE SAME

This application is a continuation of application Ser. No. 360,388, filed Mar. 22, 1982, now abandoned.

BACKGROUND OF THE INVENTION

This invention relates generally to the field of plastic extrusion processes and to lamination processes for producing products from extruded plastics

BACKGROUND ART

Multiple layer products composed of laminates of plastics and other materials find common application in a variety of packages and containers. A common example is a toothpaste tube, or similar tube for handling other materials, in which the walls of the tube are usually composed of layers of plastic, metal foil, and sometimes paper. The several components of the laminated wall contribute a combination of properties to the container which may not be possible in single layer wall. Typically the wall from which the tube is formed will provide a gas and moisture barrier, will be resistant to the chemicals inside the tube, will be heat sealable on the inner and outer layers to allow heat sealed joints to be formed, and will provide an outermost layer protecting printing and decoration on the exterior of the tube.

The outer layer of a tube package is particularly critical since, in addition to protecting the printing and other layers beneath, it should have a high gloss for aesthetic appeal. The attractiveness of the complete package is particularly dependent upon the gloss of the surface of the outer layer, and, in addition, the glossiness of the outer surface affects the visual impression transmitted from the printing below the outer layer. Distortion and "fuzzing" of the printing can occur if the outer surface is dull or has a matte finish because of the random refraction of light transmitted through the outer protective layer. It has been found, however, that extremely glossy or smooth surfaced outer layers also have a very high coefficient of friction which can lead to stacking and handling problems when the tubes are in contact with one another. The high friction of the outer surface also creates a problem when the flat wall stock is drawn through the forming die to form the tubes, since the outer surface will be in dragging contact with the die.

To minimize the coefficient of friction of a plastic surface, it is known to use a roughened or matte surfaced chill roll which impresses the extruded layer of plastic with a multitude of depressions and projections. See, for example, U.S. Pat. No. 3,540,959 to Connor. While such a matte finish can be used on the inside surface of a tube container, it is not satisfactory for the outside surface where gloss and clarity are important. High gloss is an especially important characteristic for the outer layer of a tube product because the curvature of the tube renders a dull surface finish more readily apparent to an observer.

DISCLOSURE OF THE INVENTION

In accordance with the present invention, a surface of an extruded layer of plastic is passed into contact with a chill roll which conditions and hardens the surface of the plastic layer. The resulting surface is characterized by having a high gloss, averaging 60 to 70 units on the Gardner gloss standard at an angle of 20°, a face-to-face coefficient of friction of between 0.1 and 1.0 on a Kayeness friction tester, and relatively little scattering of the light transmitted through or reflected from the surface of the layer. The surface of the plastic layer treated by the chill roll is found to be a smooth surface interrupted by randomly distributed microscopic prominences at an average frequency of about 3,000 per square centimeter, an average height varying from 2 to 10 microns, and an average area of less than 16,000 square microns. The prominences are primarily convex in shape, rounded and smooth about their peripheries, in contrast to the prominences produced by conventional pocket chill rolls in which the prominences are generally irregular and jagged about their peripheries.

The thermoplastic layer having a surface conditioned as described above is preferably coated on to a base layer, which itself may be a laminate of materials, to form a wall suitable for a tube container. The entire laminated structure may then be shaped in a die into a tube form and the overlapping edges of the tube heat sealed together, with the conditioned surface layer forming the outermost layer of the tube and covering any printing or decoration on the base layer to which it is coated.

The chill roll is preferably formed of a hard surfaced roll which is blasted with a fine grit to form minute surface depressions of random distribution and varying depth and then chromium plated. The roll so formed is then highly polished to remove a substantial portion of the chromium surface of the roll until the depressions within the roll have an average depth of about 5 microns, within a range of about 2 to 10 microns, and a standard deviation of less than about 3 microns, and having an average area of less than 16,000 square microns.

The resulting plastic product, whether it be a single layer or a multi-layer laminate, has a surface characteristic which is both high in gloss and low in coefficient of friction, possessing a substantially lower coefficient of friction than is commonly observed with present high gloss tube packages.

Further objects, features and advantages will be apparent from the following detailed description taken in conjunction with the accompanying drawings illustrating the invention.

BEST MODE FOR CARRYING OUT THE INVENTION

Figure 1:
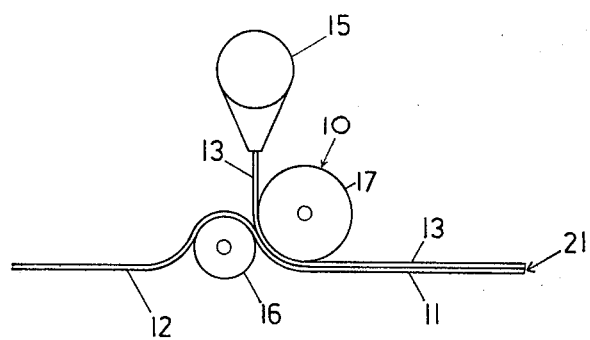
FIG. 1 is a schematic side view of extrusion and laminating apparatus used in carrying out the process of the invention.

With reference to the drawings, a simplified side view of apparatus for forming an extruded plastic sheet and for laminating sheets together is shown generally at 10 in FIG. 1. The finished laminated product is shown for illustration as having an inner surface 11 on a preformed continuous sheet or web 12, and an outer layer of thermoplastic 13. The preformed base layer 12 is typically a composite of a barrier layer formed of a material such as metal foil which is impervious to gas and moisture, with a surface layer of plastic such as polyethylene. Such a structure is illustrative only, since common wall structures for packages such as toothpaste tubes usually have more than three layers, including layers of paper and special plastics. It is also common for the outer surface of the layer 12 to have printing and decoration laid thereon which is covered and protected by the outermost layer 13. The present invention resides primarily in the manner of forming and surface conditioning the outermost layer 13; the base layer or laminate on which the layer 13 is laid, illustratively shown as the single layer 12, may be formed and laminated in any desired manner.

Figure 2:
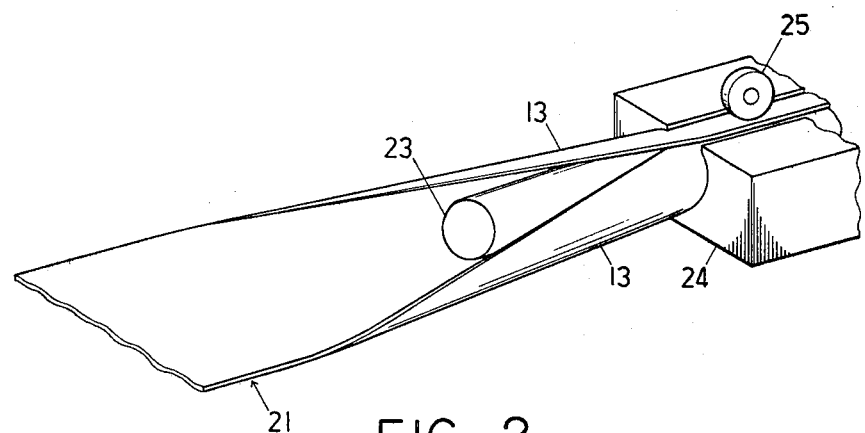
FIG. 2 is a simplified perspective view of the shaping operation showing the step of forming a continuous tube from a web of laminate produced in accordance with the invention.

The material forming the outer layer 13 may be any of the common thermoplastics which are tough and relatively transparent, such as polyethylene, polyvinyl chloride, polyvinylidine chloride, and polypropylene. The thermoplastic material is heated to a fluid state and is extruded as a single layer film from an extruder 15. The heated film, while still soft, is pressed and bonded to the surface of the composite layer 12 in a nip formed between a backup roller 16 and a chill roller 17. The finished laminate 21, comprised of the layers 12 and 13, may then be cut, as desired, and rolled into a tube by being formed over a mandrel 23 and drawn through a forming die 24 as illustrated in FIG. 2. The overlapped longitudinal edges of the laminate 21 are heat sealed together by a heated pressure roller 25, as further described in the aforesaid U.S. Pat. No. 3,540,959, or by other conventional means, such as shown in U.S. Pat. No. 3,388,017. In the forming of the laminate 21 into a tube, the layer 13 forms the outermost layer, which is visible to the consumer.

The roller 17 which contacts what will become the outersurface of the layer 13 is typically maintained at a constant temperature while it is rotating by circulating water or another liquid through its interior. As the surface of the roller 17 contacts the hot plastic exiting from the extruder 15, the plastic drops in temperature and substantially hardens. The surface characteristics of the chill roller will thus be permanently impressed upon the surface of the plastic. To achieve the high gloss desired on the outside surface of container tubes such as those used to carry toothpaste, it has been common to use a highly polished (commonly called a mirror finish), chrome plated chill roller. Tubes formed from plastic treated with such a chill roller typically have a gloss level between 60 and 80 units (as measured with a Hunter gloss meter, at TAPPI 20° angle) and a coefficient of friction of 6 to 8 units (as measured face-to-face on a Kayeness friction tester). The gloss and clarity of the surface obtained with such a chill roller is satisfactory, but the high level of friction presents difficulties in forming the tubes and also in handling the tubes during packing and shipping.

Figure 3:
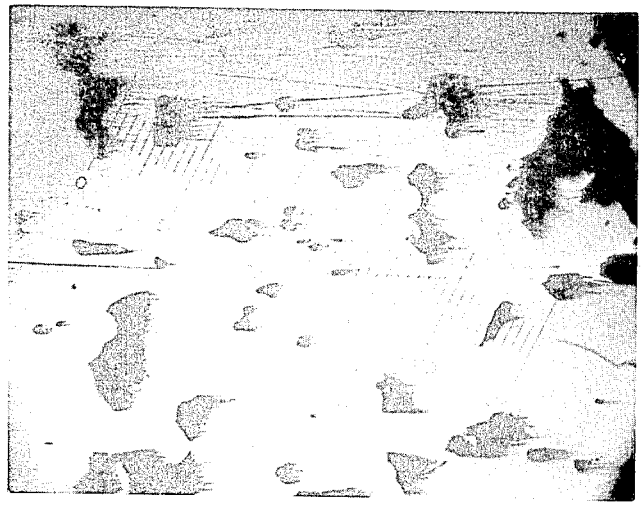
FIG. 3 is a photomicrograph of the surface of a prior art chill roll.
Figure 4:
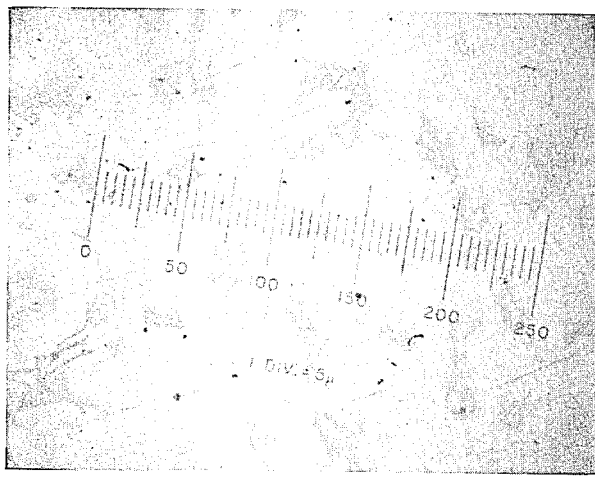
FIG. 4 is a photomicrograph of the surface of a sheet produced with the chill roll of FIG. 3.
Figure 5:
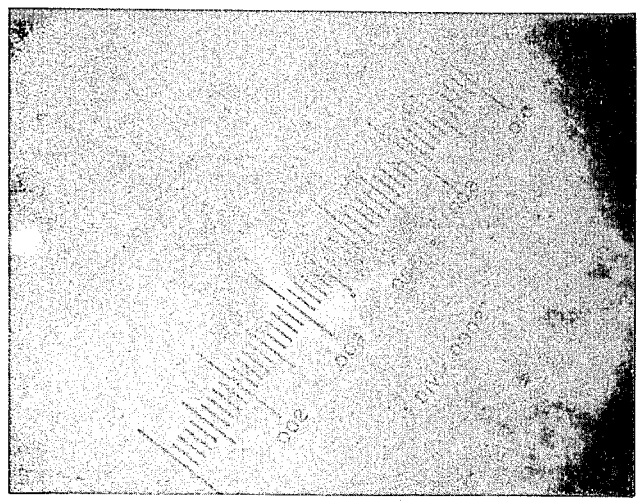
FIG. 5 is a higher magnification of the surface of the sheet produced with the chill roll of FIG. 3.

One approach to the problem of producing extruded plastic sheets having satisfactory gloss and friction characteristics is to use a polished chill roll which has minute surface depressions. An example of such a commercial roller, manufactured by Mirror Polishing & Plating Company, is shown in the photomicrograph of FIG. 3 at a magnification of 50×. The production of this type of roller is generally described in U.S. Pat. No. 3,300,286. The depth of the depressions may be measured by successively focusing a microscope at the top and bottom of individual depressions and correlating the change in focus with depth. By making measurements in this manner, the depressions in the roll of FIG. 3 were found to have an average depth of 12 microns and a depth standard deviation of about 6.25 microns, varying from a minimum depth of 1 to 2 microns to a maximum depth of greater than 30 microns. The surface of a multiple layer sheet having a surface layer 13 formed of low density polyethylene using the roll of FIG. 3 as the chill roller is shown in FIGS. 4 and 5. The photomicrograph of FIG. 4 is at a magnification of 50×, and the photomicrograph of FIG. 5 is at a magnification of 200×. It is noted from an examination of FIGS. 4 and 5 that the prominences formed on the web—corresponding to the depressions in the chill roll—are jagged and irregular about their peripheries. The source of the irregular peripheries of the prominences is revealed from an examination of FIG. 3, since the depressions in the roll have jagged peripheries. The polyethylene surface was found to have a satisfactory face-to-face coefficient of friction, in the range of 0.3 to 0.5, but the measured gloss was in the range of 25 to 40 (Gardner gloss guard, 45° angle) compared to a gloss measurement of about 50 (Gardner gloss guard, 45° angle) for standard polyethylene films produced with a smooth chill roller. When such a chill roller is used to produce the outer layer of a laminate in which such transparent outer layer covers printing, a slight reduction of the clarity of the printed matter is observed. The many jagged protrusions observed about the peripheries of the prominences on the plastic sheets of FIGS. 4 and 5 may tend to diffuse or scatter light from the surface, thus reducing gloss.

Figure 6:
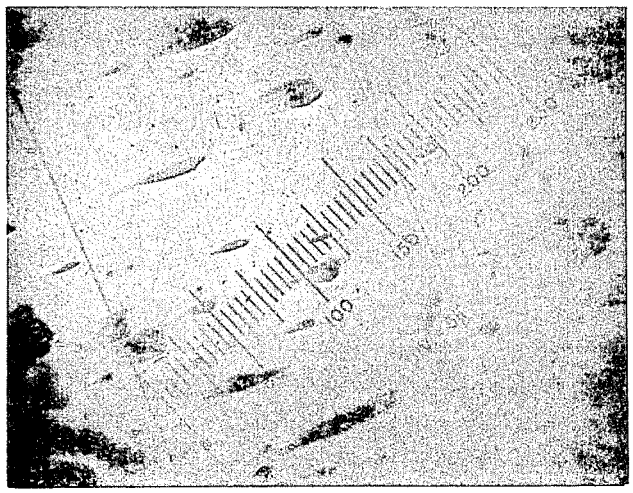
FIG. 6 is a photomicrograph of the surface of a chill roll adapted for use in performing the method of the present invention.

A photomicrograph at a magnification of 50× of the surface of a chill roller used to produce plastic film in accordance with the present invention is shown in FIG. 6. The roller of FIG. 6 is produced by polishing down a substantial portion of the chromium plated surface of a standard roller such as shown in FIG. 3 such that the average depth of the depressions and their average area is greatly reduced. It is found that the jagged, irregular peripheries characteristic of the depressions in the chill roll of FIG. 3 are substantially eliminated by such extreme polishing. The roller of FIG. 6 has randomly distributed depressions with an average depth of about 5 microns, a standard deviation of the depth of the depressions of less than 3 microns, and an average area less than 16,000 square microns. The chill roller of FIG. 6 may be formed by polishing the surface of a roller such as that shown in FIG. 3 to reduce the average depth of the depressions in the surface to one half or less of the depth of the depressions before polishing. The average frequency of depressions over the surface of the roller is approximately 3000 per square centimeter. As seen in FIG. 6, the depressions are substantially convex in shape and substantially free of the irregularities about the perimeter of the depressions that are observed in FIG. 3.

Figure 7:
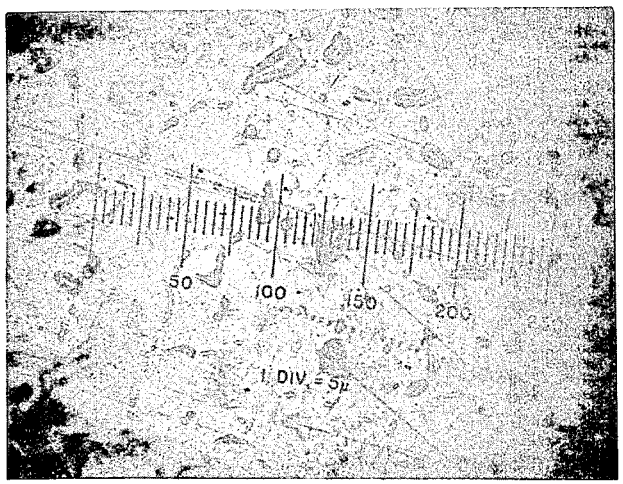
FIG. 7 is a photomicrograph of the surface of a sheet produced with the chill roll of FIG. 6 in accordance with the invention.
Figure 8:
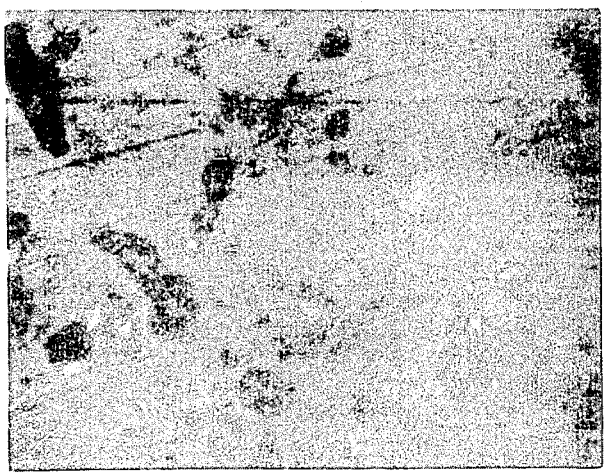
FIG. 8 is a photomicrograph of the sheet as in FIG. 7 at higher magnification.

Photomicrographs of a polyethylene sheet formed using the chill roller of FIG. 6 as the roller 17 are shown in FIG. 7 (50×) and FIG. 8 (150×). It is readily seen that the prominences formed on the surface of the sheet are substantially convex and are regular around their periphery with relatively few jutting, jagged portions extending away from the prominences. A multilayer sheet having a low density polyethylene outer layer 13 formed in such a manner was found to have a coefficient of friction, as tested face-to-face on a Kayeness Friction Tester, in the range of 0.1 to 1.0, over a selection of several samples formed in accordance with the invention. The gloss was found to be in the range of 60 to 70 units, at a TAPPI 20° angle. The heights of the prominences, which correspond to the depths of the depressions on the chill roll, lie almost entirely in the range of 2 to 10 microns, with a standard deviation of less than 3 microns (generally ranging from 2 to 3 microns), about the average prominence height of 5 microns. The area occupied by individual prominences average less than 16,000 square microns.

A multilayer laminate suitable for use as a tube container wall was produced in accordance with the process shown in FIG. 1. The layer 13 was formed of a coextrusion of low density polyethylene resins and was adhered to a white pigmented polyethylene layer having ink printing on its top surface. The layer 13 was transparent and had a caliper of approximately 1.5 mils (38.1 microns). The outer surface of the laminate had a face-to-face coefficient of friction of less than 1.0 and a gloss at a TAPPI 20° angle of approximately 60. The printing covered by the layer appeared clear and sharply defined.

It is understood that the invention is not confined to the particular embodiments herein illustrated and described, but embrace such modified forms thereof as come within the scope of the following claims.

I claim:

1. A method of producing a plastic sheet having a surface with both high gloss and low coefficient of friction characteristics, comprising the steps of:

(a) extruding a thermoplastic material to form a heated thermoplastic layer;

(b) pressing a surface of the heated, thermoplastic layer while still in a softened state with a chill roller which is maintained at a temperature at which it will cool and harden the surface of the layer to impress the surface characteristics of the chill roller upon the surface of the thermoplastic layer, the chill roller having a highly polished surface interrupted by minute depressions distributed over the surface of the roller, the depressions having an average depth of about 5 microns, a standard deviation of the depth of less than 3 microns, an average area for each depression of less than 16,000 square microns, and an average frequency of depressions over the surface of the roller of approximately 3,000 per square centimeter, the depressions being substantially convex and rounded about the periphery of the depressions, such that the surface of the thermoplastic layer has prominences formed thereon, corresponding to the depressions in the chill roller surface, which are convex and rounded about their peripheries.

2. The method of claim 1 including the additional steps of:

forming a base layer of at least one selected material; and placing the surface of the thermoplastic layer opposite to that which contacts the chill roller in contact with the base layer and applying pressure to all of the layers to form a laminate.

3. The method of claim 2 including the additional step of:

shaping the laminate between a forming mandrel and forming die by moving the laminate longitudinally and folding it into a tube shape about the mandrel with the thermoplastic layer on the outside of the tube in sliding contact with the die and with the longitudinal edges of the laminate being overlapped, and heat sealing the overlapped longitudinal edges of the laminate together to form a closed tube.

* * * * *